DYNAMIC DATA STORAGE CIRCUIT

Filed March 2, 1962 2 Sheets-Sheet 1

INVENTORS.
WILLIAM F. BARTLETT
BARRIE BRIGHTMAN
BY Robert L Nathans
ATTORNEY

United States Patent Office | 3,231,867
Patented Jan. 25, 1966

3,231,867
DYNAMIC DATA STORAGE CIRCUIT

William F. Bartlett, Rochester, and Barrie Brightman, Webster, N.Y., assignors to General Dynamics Corporation, Rochester, N.Y., a corporation of Delaware Filed Mar. 2, 1962, Ser. No. 176,967
6 Claims. (Cl. 340—172.5)

The present invention relates to dynamic data storage circuits and, more particularly, to dynamic data storage circuits of the recirculating type.

In the field of data processing and electronic switching, there has been a need for a very high-speed dynamic storage circuit. More particularly, in electronic switching telephone centers, it is desirable to utilize circuitry providing a single recirculation loop for the dynamic storage of one hundred fifteen-bit numbers having a length of one microsecond, said recirculation occurring ten thousand times a second. In other words, the total delay time of the desired recirculation loop should be one hundred microseconds so that the loop will have a total capacity of one hundred numbers. In addition, it is often necessary to erase each number and rewrite it once upon each recirculation. In the alternative, a number of storage loops could be operated at slower speeds, but the use of multiple loops is considerably more expensive and, furthermore, causes the reliability factor to decrease. With the above-described high-speed operation, the use of prior art recirculation loops would necessitate the erasure of each bit in up to fifteen sections of a tapped buffer delay line, or other storage means, and rewriting up to fifteen bits into each section, all in a period of sixty-six nanoseconds ($^{66}/_{1000}$'s of a microsecond). The present invention was developed since storage devices, as presently developed, cannot operate at this extremely high speed.

In addition, the problem of stepping each bit around the recirculation loop at high frequencies, such as fifteen megacycles, aggravates the problem of providing sufficient time to determine whether or not to alter each number once it has been inserted into the static store. In other words, a decision circuit must make use of the number within the store and other conditions to decide whether to alter or erase the number and what the necessary change must be. The preferred embodiment of the present invention, unlike the prior art, provides over one-half of a microsecond for this purpose.

Accordingly, it is the principal object of the present invention to provide a new and improved dynamic data storage circuit of the recirculating type.

It is a further object of the present invention to provide a new and improved dynamic data storage circuit of the recirculating type which is capable of erasing and rewriting each of one hundred fifteen-bit numbers once during each recirculation, which recirculation occurs ten thousand times a second.

Further objects and advantages of the invention will become apparent as the following description proceeds, and the features of novelty which characterize the invention will be pointed out with particularly in the claims annexed to and forming a part of this specification.

Figure 1:
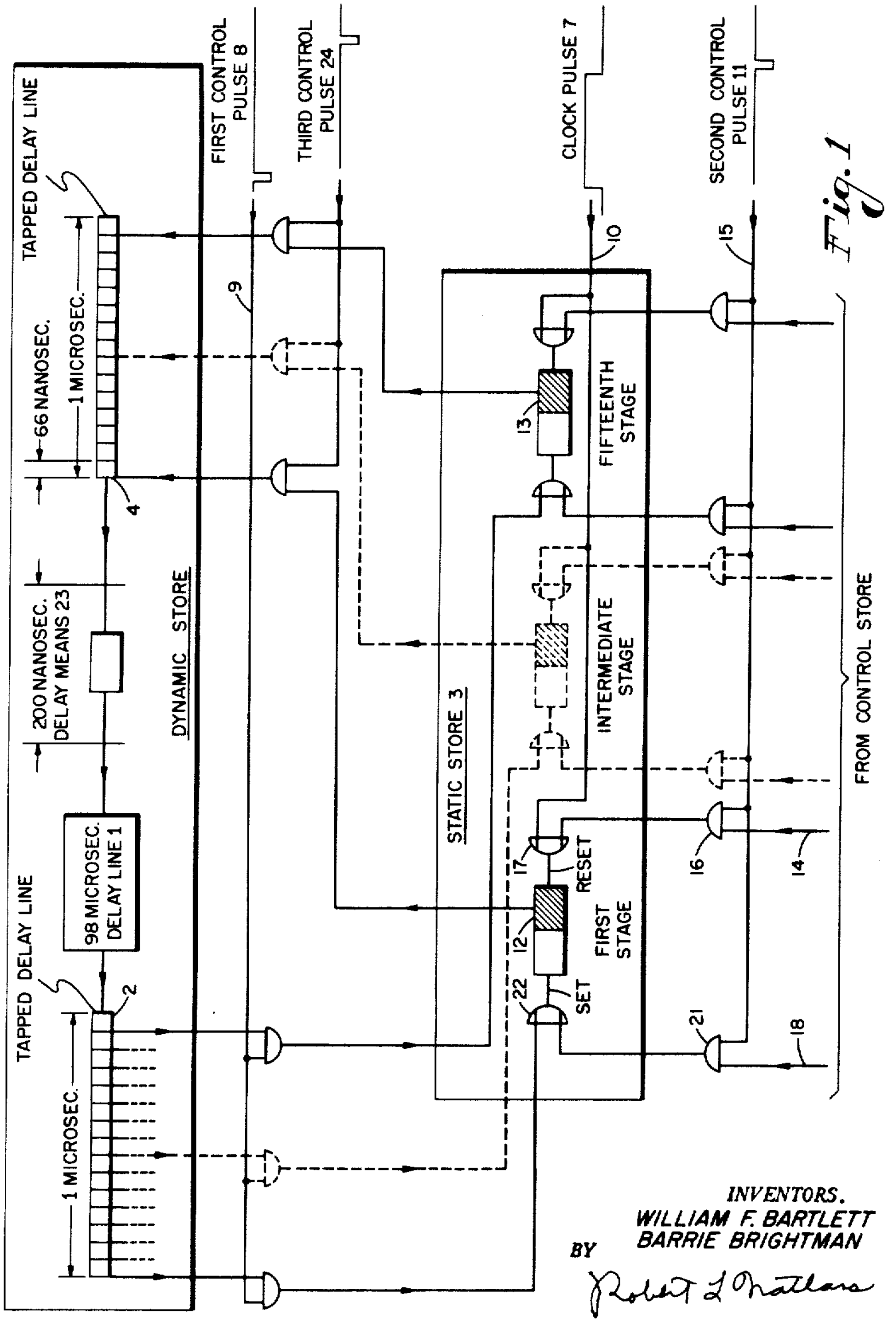
Figure 2:
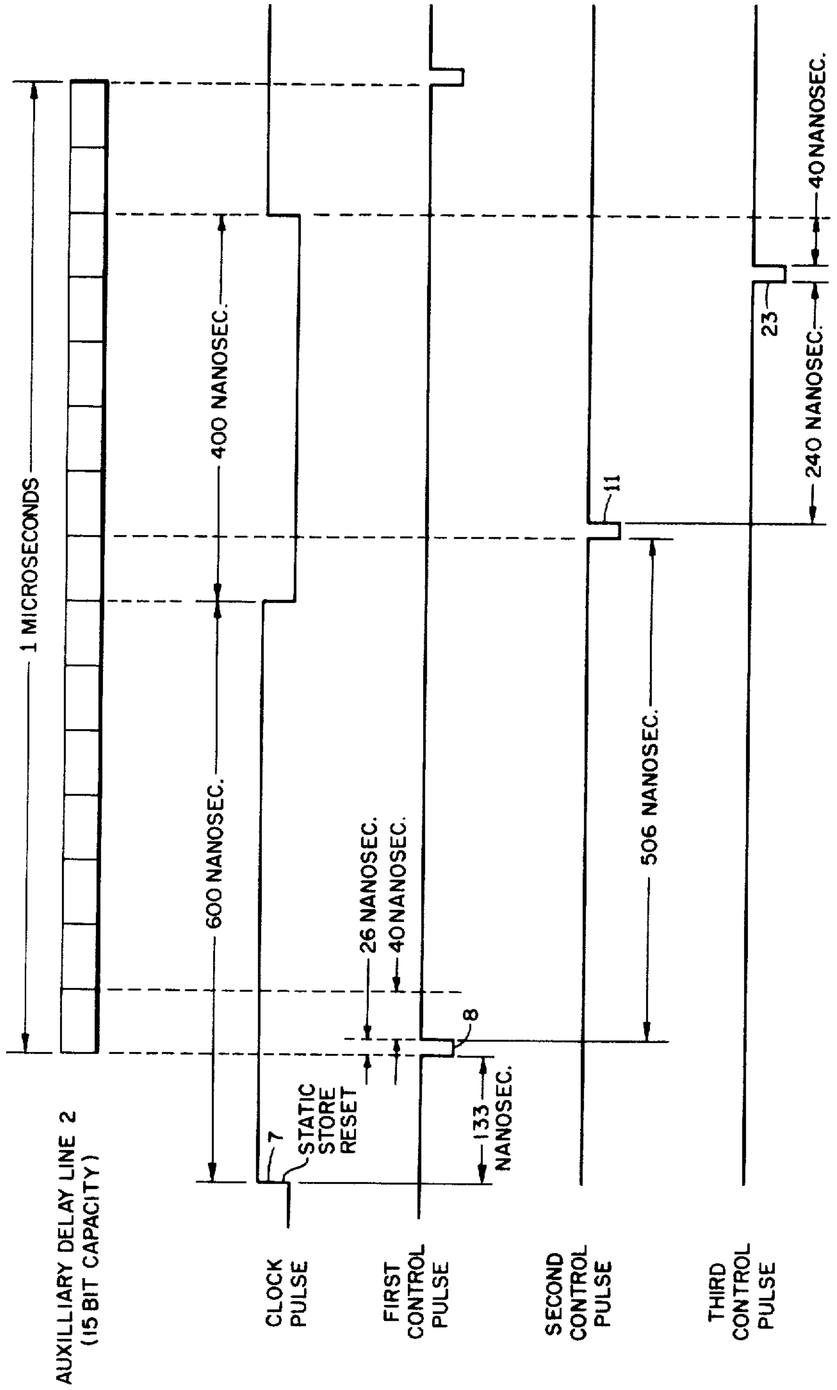

For a better understanding of the invention, reference may be had to the accompanying drawing in which:

FIG. 1 discloses a schematic diagram of a preferred embodiment of the present invention; and FIG. 2 discloses a timing chart which will be helpful in the understanding of the operation of the circuit of FIG. 1.

In accordance with the present invention, a main data store having a capacity of ninety-eight fifteen-bit numbers is coupled in tandem with a pair of auxiliary stores, each having a one number capacity. One of the auxiliary stores, which may be a tapped delay line, is connected with a static store, which may comprise a plurality of flip-flops, so as to transfer a single number into the static store in parallel fashion upon the occurrence of a first control signal. The occurrence of a second control signal causes the number contained within the static store to be changed, if desired. The occurence of a third control signal causes the altered, or unaltered, number to be read into the other of the auxiliary stores in parallel fashion. Since the time intervals between changes in the states of the flip-flops are no less than one hundred and fifty-nine nanosecond intervals between the resetting of the static store and the read-in operation, the flip-flops contained within the static store need not operate at the prohibitive rates mentioned hereinbefore.

Referring now to FIG. 1 of the drawing, a main data store, which consists of a ninety-eight microseconds delay line 1 is connected to an auxiliary store 2, which may consist of a one microsecond tapped delay line. Since each fifteen-bit number is one microsecond in length, it is apparent that the main store 1 has a capacity of ninety-eight numbers and auxiliary store 2 has a capacity of one number. Auxiliary store 2 consists of fifteen tapped sections, one for each bit in the number. Each section of auxiliary store 2 is coupled to static store 3 through fifteen AND gates. The output circuits of each of the fifteen flip-flops contained within static store 3 are coupled to auxiliary store 4 through fifteen AND gates. Auxiliary store 4 is virtually identical with auxiliary store 2 since it also has a one number capacity. The output circuit of auxiliary store 4 is connected to the input circuit of main store 1 through a two hundred nanoseconds delay means, as shown. The recirculation loop is completed by coupling the output circuit of main store 1 to the input circuit of auxiliary store 2. A control store (not shown) is coupled to static store 3 through fifteen pairs of AND gates so that the binary numbers inserted into static store 3 may be changed, if desired, once for each recirculation.

The application of leading edge 7 of the clock pulse (shown in FIG. 2) to the reset terminals of the flip-flops of static store 3, over conductor 10, causes all of the flip-flops to become reset, thereby to clear the store. One hundred and thirty-three nanoseconds later, one of the one hundred numbers circulating in the loop has just completely filled auxiliary store 2. At this time, a first control pulse 8 is applied over conductor 9 to enable the fifteen AND gates coupling auxiliary store 2 with static store 3, as shown. Those sections of auxiliary store 2 containing bits or binary ones will cause associated flip-flops in static store 3 to become set. Accordingly, the number contained within auxiliary store 2 is transferred into static store 3 in parallel fashion. Five hundred and six nanoseconds later, a second control pulse 11 is applied to conductor 15, thereby to enable the AND gates coupling the control store with the static store 3. This enabling pulse will allow the binary number stored in static store 3 during this interval to be changed to the binary number stored in the control store if any disparity exists between these numbers. The control store is designed so as to have two output leads for each stage of static store 3. A mark will be produced on one or the other of these leads depending upon whether a binary one or a binary zero is contained within each stage of the control store. For example, let it be assumed that the binary number transferred from auxiliary store 2 into static store 3 comprises a bit only in the first stage of auxiliary store 2. Flip-flop 12 will be the only flip-flop within static store 3 which becomes set. Let it also be assumed that the binary number in the control store at the time when the second control pulse is applied to conductor 15 merely comprises a binary one or bit in the fifteenth digit position. Under the circumstances, it is necessary to cause flip-flop 12 to become reset to reflect the change in the first digit from a 1 to a 0, and it is also necessary to cause the fifteenth flip-flop 13 to become set to indicate that the fifteenth digit has been altered from a binary zero to a binary one. The occurrence of a binary zero in the first stage of the control store will cause a mark to be impressed upon conductor 14 so as to reset flip-flop 12 to the zero state by forwarding said mark through AND gate 16 and OR gate 17. On the other hand, should a binary one be contained within the first stage of the control store, a mark will be present on conductor 18 rather than on conductor 14 and, as a result, flip-flop 12 will remain set since said mark will be forwarded through AND gate 21 and OR gate 22. In contrast with the first stage, the presence of a one in the fifteenth stage of the control store will cause a mark to be applied to the set terminal of flip-flop 13 to make it revert to the set or binary one condition from the reset or binary zero position. Hence, disparity between the sections of the stores will cause the number within static store 3 to correspond to the number within the control store. Upon the application of the third control pulse 24 to the AND gates coupling the output circuit of static store 3 to auxiliary store 4, the binary number is transferred in parallel fashion into auxiliary store 4. Forty nanoseconds thereafter, the flip-flops of static store 3 become reset by the application of the leading edge 7 of the clock pulse to conductor 10, as explained hereinbefore. The second cycle continues as the first control pulse 8 is applied to conductor 9, as previously explained, thereby to transfer the next number from auxiliary store 2 into static store 3.

The two hundred nanoseconds delay means 23 is necessary because it takes less than one microsecond for the binary number to be read out of auxiliary store 2 and to be reinserted into auxiliary store 4. In this connection, note that the first and third control pulses are separated by seven hundred and ninety-eight nanoseconds. Accordingly, delay means 23 should have a delay equal to one thousand microseconds less seven hundred and ninety-eight nanoseconds, or a delay of about two hundred nanoseconds. In other words, the composite delay time of lines 1 and 2 is equal to ninety-nine microseconds and, accordingly, the delay time through the remaining portions of the loop must be equal to one microsecond.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. A storage circuit for the dynamic storage of *m* units of information each having *n* subunits, *m* and *n* being integers, comprising:

(a) a main store having an input and output circuit for serially retaining $m-2$ of said units, (b) a first and second auxiliary store each having a capacity of at least one of said units and each having *n* sections, one for each of said subunits, (c) a static store having a capacity of at least one of said units and having *n* sections, one for each subunit of the unit stored therein, (d) means for coupling the first section of said first auxiliary store to the first section of said static store and for coupling the *n*th section of said first auxiliary store to the *n*th section of said static store upon the insertion of a complete unit within said first auxiliary store to transfer the last mentioned unit from said first auxiliary store into said static store, (e) means for thereafter selectively altering one or more of the subunits stored within said static store if desired, (f) means for thereafter coupling said first section of said static store to the first section of said second auxiliary store and for coupling the *n*th section of said static store to the *n*th section of said second auxiliary store to transfer the unit from said static store into said second auxiliary store, (g) means for coupling one end of said second auxiliary store to the input circuit of said main store, and (h) means for coupling the output circuit of said main store to one end of said first auxiliary store.

2. The combination as set forth in claim 1 wherein said main store and said first and second auxiliary stores comprise delay lines.

3. The combination as set forth in claim 1 wherein each section of said static store includes a bistable circuit.

4. A storage circuit for the dynamic storage of *m* units of information each having *n* subunits, *m* and *n* being integers, comprising:

(a) a main store having an input and output circuit for serially retaining $m-2$ of said units, (b) a first and second auxiliary store each having a capacity of at least one of said units and each having *n* sections, one for each of said subunits, (c) a static store having a capacity of at least one of said units and having *n* sections, one for each subunit of the unit stored therein, (d) means for coupling the first section of said first auxiliary store to the first section of said static store and for coupling the *n*th section of said first auxiliary store to the *n*th section of said static store upon the insertion of a complete unit within said first auxiliary store to transfer the last mentioned unit from said first auxiliary store into said static store, (e) means for thereafter selectively altering one or more of the subunits stored within said static store if desired, (f) means for thereafter coupling said first section of said static store to the first section of said second auxiliary store and for coupling the *n*th section of said static store to the *n*th section of said second auxiliary store to transfer the unit from said static store into said second auxiliary store, (g) means for coupling the first section of said second auxiliary store to the input circuit of said main store, and (h) means for coupling the output circuit of said main store to the *n*th section of said first auxiliary store.

5. The combination as set forth in claim 4 wherein said main store and said first and second auxiliary stores comprise delay lines.

6. The combination as set forth in claim 4 wherein each section of said static store includes a bistable circuit.

References Cited by the Examiner

UNITED STATES PATENTS

| | | | |
|---|---|---|---|
| 2,827,566 | 3/1958 | Lubkin | 340—172.5 |
| 2,866,177 | 12/1958 | Steele | 340—172.5 |
| 3,076,181 | 1/1963 | Newhouse et al. | 340—174 |
| 3,077,581 | 2/1963 | Grady | 235—165 |

FOREIGN PATENTS

| | | |
|---|---|---|
| 749,836 | 6/1956 | Great Britain. |

ROBERT C. BAILEY, *Primary Examiner.*

MALCOLM A. MORRISON, *Examiner.*